United States Patent [19]

Gathings

[11] Patent Number: 4,875,396
[45] Date of Patent: Oct. 24, 1989

[54] APPARATUS FOR FEEDING BAR STOCK TO A MACHINING OPERATION

[76] Inventor: Thomas Gathings, 4094 Maple Ave., Burlington, N.C. 27215

[21] Appl. No.: 170,163

[22] Filed: Mar. 21, 1988

[51] Int. Cl.⁴ ............................................. B23B 13/00
[52] U.S. Cl. ...................................... 82/124; 82/125; 82/126; 82/127
[58] Field of Search ............. 82/2.5, DIG. 5, DIG. 8, 82/2.7, 124 OR, 125 X, 126 X, 127 X, 163

[56] References Cited

U.S. PATENT DOCUMENTS

| | | | |
|---|---|---|---|
| 3,557,971 | 1/1971 | Tomiyama | 82/2.5 |
| 3,618,787 | 11/1971 | Nemoto | 82/2.7 |
| 3,696,696 | 10/1972 | Bechler | 82/2.5 |
| 3,828,630 | 8/1974 | Argereu | 82/2.5 |
| 4,068,545 | 1/1978 | Scheler | 82/2.7 |
| 4,217,800 | 8/1980 | Furegati | 82/2.5 |
| 4,221,141 | 9/1980 | Oliver | 82/2.5 |
| 4,406,190 | 9/1983 | Mason | 82/2.7 |
| 4,621,550 | 11/1986 | Berns | 82/2.5 |
| 4,638,693 | 1/1987 | Sugimoto | 82/2.7 |

*Primary Examiner*—Frederick R. Schmidt
*Assistant Examiner*—Lawrence Cruz
*Attorney, Agent, or Firm*—Rhodes and Coats

[57] ABSTRACT

A plurality of bar stock retaining sleeves control the bar stock fed therethrough to a machine center to prevent excessive vibration and end-whipping during a cutting and machining operation. A first retaining sleeve is positioned within the feed orifice of the machine center, and includes a master bushing having an inner diameter substantially equal to the outer diameter of the bar stock being cut, which master bushing is positioned adjacent the orifice outlet at the the cutting head. A second retaining sleeve is supporting exteriorly of the machine center in abutting relationship to the stock inlet of the feed orifice. The second retaining sleeve includes at least two bushings having an inner diameter substantially equal to the outer diameter of the bar stock, the two bushings being connected in spaced relationship to each other by an elongated cylindrical tube having an inner diameter greater than the inner diameter of the connected bushings. Bearing mounted bushings having hexagonal or square inner shapes are utilized for cutting hexagonal or square bar stock.

6 Claims, 4 Drawing Sheets

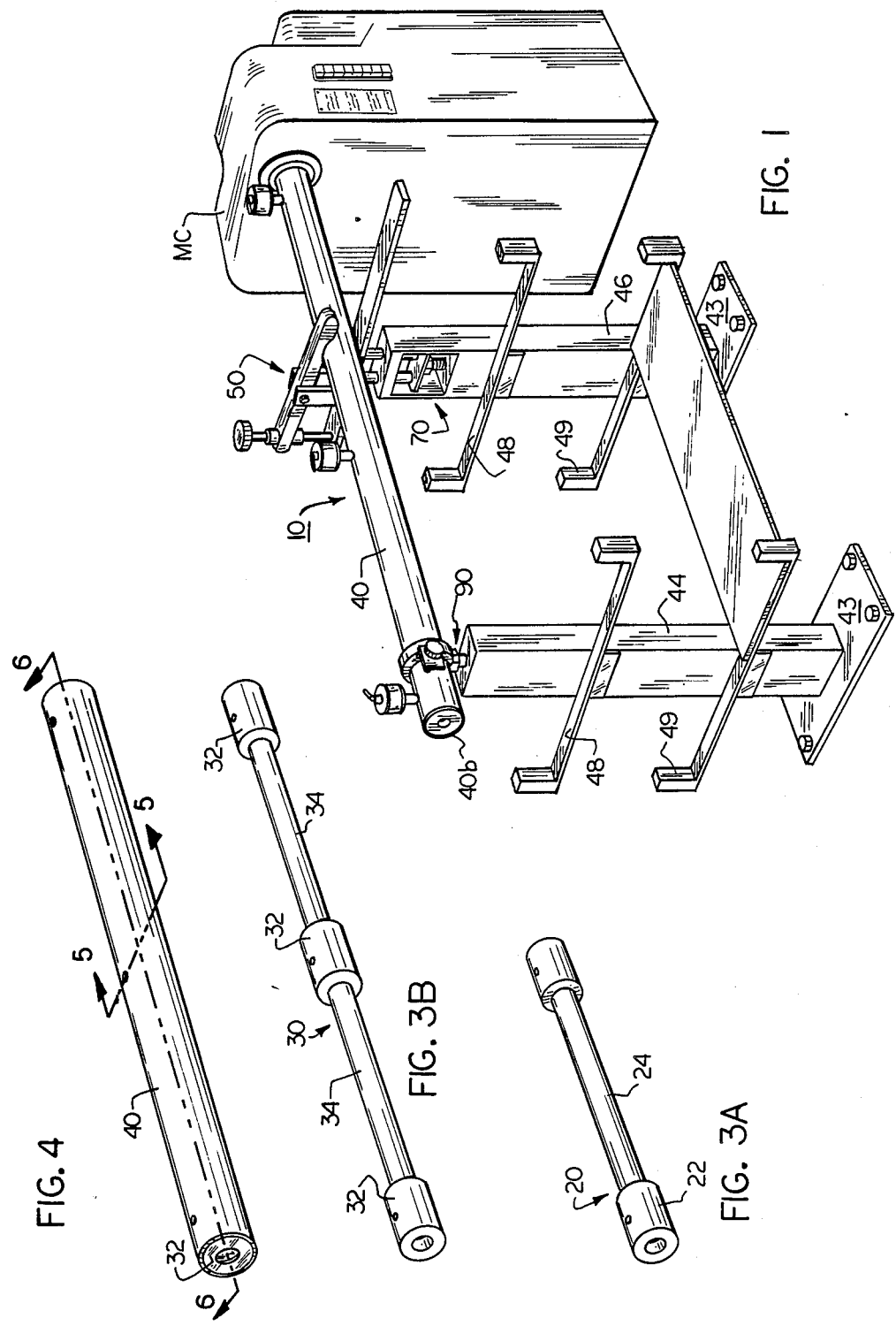

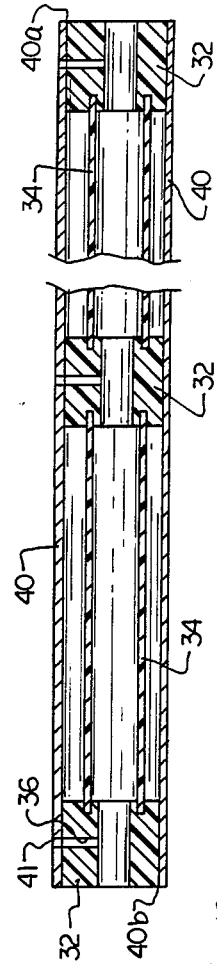
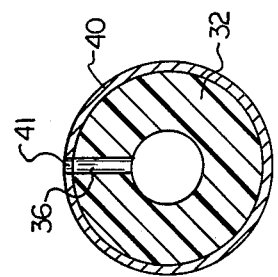
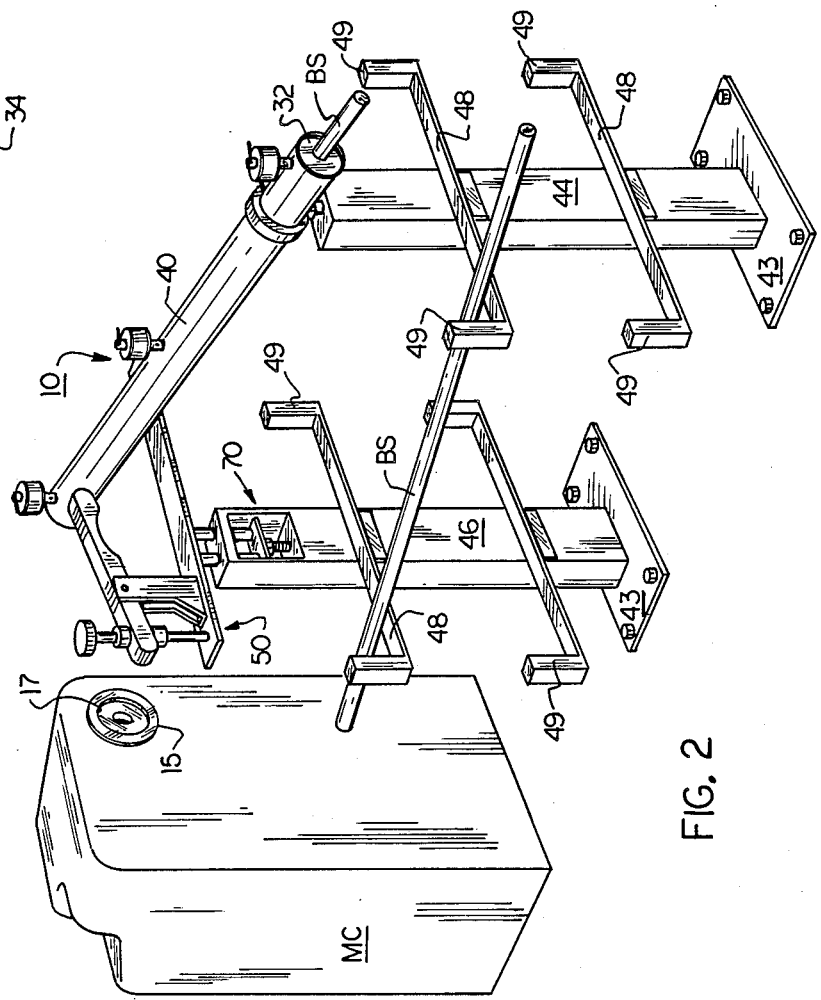
FIG. 6
FIG. 5
FIG. 2

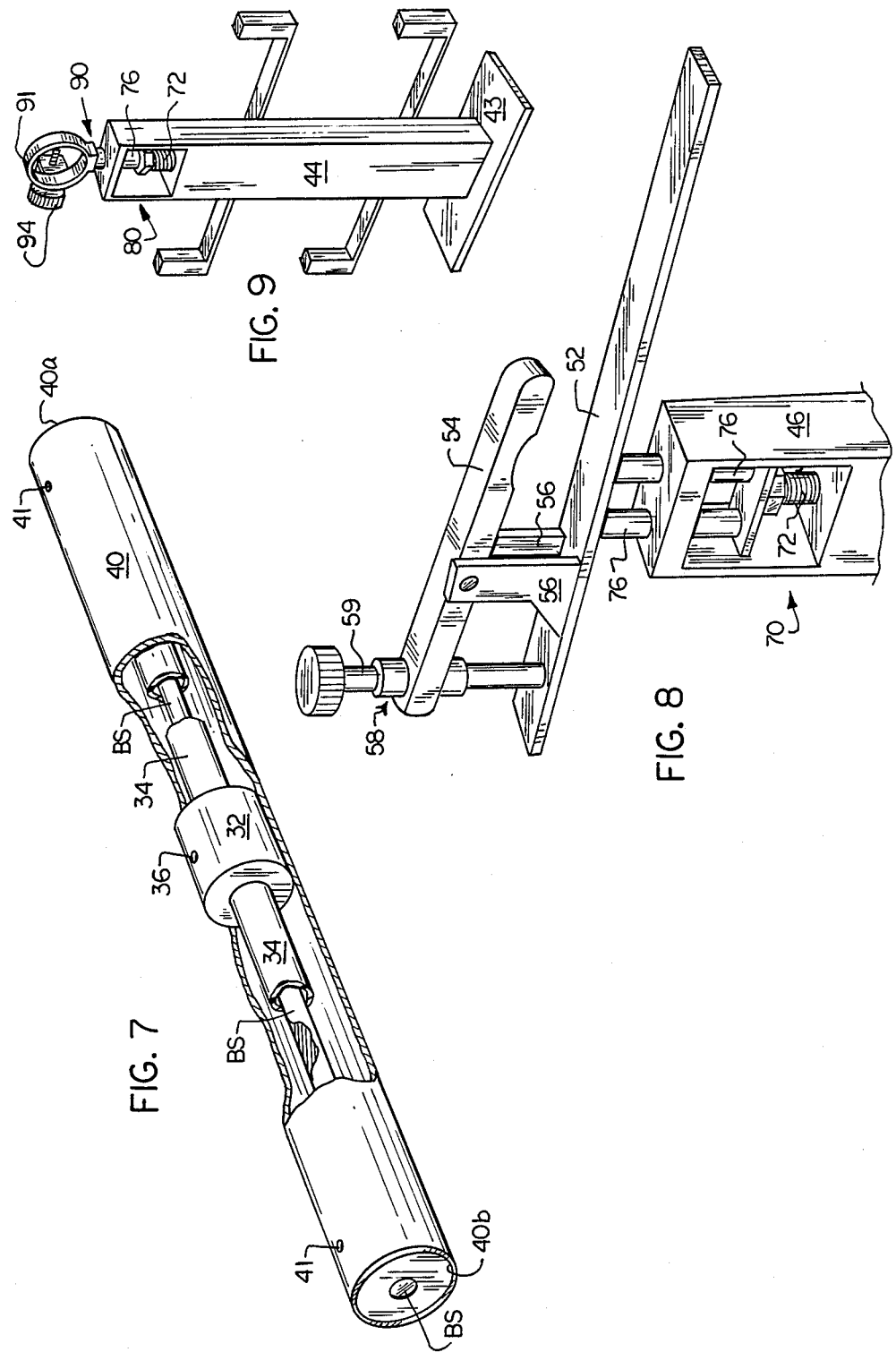

APPARATUS FOR FEEDING BAR STOCK TO A MACHINING OPERATION

BACKGROUND AND SUMMARY OF THE PRESENT INVENTION

The present invention is related to apparatus for controlling the feeding of elongated lengths of bar stock, metallic or non-metallic, to the cutting head of a CNC machine center or other type of lathe. Contemporary machine shops are increasingly relying on the use of CNC (Computer numerical control) machine centers for a variety of operations. The CNC machine centers are high-speed, demonstrate high levels of accuracy, and are virtually fully automated.

One operation that has remained somewhat problematic, however, is the automatic feeding of bar stock to the center cutting head. Bar stock most frequently is metal and of a length often in excess of eight to ten feet. Most CNC machine centers have a continuous and automatic feed mechanism wherein the bar stock is fed into an inlet in the machine center and then automatically pulled through a feed orifice having an outlet into the cutting head. When the bar stock is not fully controlled or restrained along its length, the free end, which is away from the cutting head, is subject to high levels of vibration manifested by end-whipping or slapping as the stock is turned. Such bar stock is turned at very high speeds, frequently in excess of 5,000 revolutions per minute. Therefore, when vibration of the free end is not controlled, accuracy of the cutting operation is severely affected.

Known attempts to compensate for this vibration problem include apparatus designed to restrain the bar stock during the feeding and turning process. Such apparatus generally is comprised of some type of sleeve or cylinder through which the stock is fed; the inner diameter of the sleeve being reduced to a dimension just larger than the diameter of the bar stock and thus utilized to reduce vibration of the free end of the stock.

Most apparatus which is particularly adapted for CNC machine centers include large, awkward-to-handle feeding tubes having continuous inner diameters generally somewhat greater than the outer diameter of the stock, so that the stock does not contact the tube and create drag. No attempt has previously been made to reduce the inner diameter down to that which is substantially the equivalent of the outer diameter of the stock because the drag created thereby substantially reduces cutting time and accuracy. However, when drag is fully eliminated, vibration resumes.

The present invention is directed to an apparatus which is useful with a variety of types of machine centers and lathes, and which can be easily adapted to feed stock of almost any diameter or length. The apparatus restrains bar stock within very close tolerances and thereby substantially eliminates any vibration or whipping effect. In its simplest embodiment the present invention is a feed means that restrains bar stock, both exteriorly of the machine center and also within the feed orifice which leads up to the cutting head, by means of a restraining sleeve, portions of which are comprised of bushings which have an inner diameter substantially equivalent to the outer diameter of the bar stock which is being cut. Because only relatively short, spaced-apart segments of the restraining sleeve are in contact with the bar stock being fed therethrough, the bar stock is not subjected to the drag effect that slows cutting speed. The bar stock is however, restrained from any vibratory end whipping effect and the rpms can be substantially increased. Thus, both the cutting speed and the accuracy of the cutting are improved.

In the preferred embodiment, a first restraining sleeve is removably positioned in the feed orifice of the CNC machine center to control vibration of the bar stock near the point of cutting. A second restraining sleeve is supported outside the CNC center, in abutting relationship to the inlet to the feed orifice, to control the free end of the bar stock as it is fed into the orifice. Both restraining sleeves and the bushings therein are provided in a variety of sizes in order to accomodate bar stock of various outer diameters.

The second restraining sleeve, supported outside the CNC center, is removably inserted in a support tube that is mounted adjacent the CNC machine center. When the outer diameter of the bar stock changes, the restraining sleeves are selectively exchanged as appropriate by removing the sleeves from the feed orifice and support tube and replacing with sleeves having the appropriate inner diameter. Such changes can be made in very little time and with no affect on the program control of the CNC machine center. Special needle bearing-mounted bushings are substituted for the primary stationery bushings when hexagonal or square bar stock is being cut. The inner wall of these bushings is squared or hexagonally shaped to accept such stock.

In addition to a greatly improved means for feeding bar stock to a machine center, the preferred embodiment of the present invention further provides means for supporting a supply of stock for operation. The details of the structure are outlined below. A study of these details reveals how the primary objective of providing a highly improved means for controlling the feeding of bar stock to a lathe is achieved. Other objectives include the provision of a bar stock feeding apparatus that improves accuracy by elimination of vibration and end-whipping of the stock, without creating excessive drag which slows cutting speed. Other and further advantages will be realized as the following detailed description is studied in conjunction with the accompanying drawings. In the drawings:

FIG. 1 is a perspective view of a preferred embodiment of the present invention in an operative position;

FIG. 2 is a perspective view of the embodiment of FIG. 1, showing the feed apparatus pivoted into a loading/unloading position;

FIGS. 3a and 3b are perspective views of the interchangeable restraining sleeves as removed from the supporting apparatus;

FIG. 4 is a perspective view of the supporting tube and enclosed restraining sleeve of FIG. 3;

FIG. 5 is a cross-sectional view taken along lines V—V of FIG. 4;

FIG. 6 is a cross-sectional view taken along lines VI—VI of FIG. 4;

FIG. 7 is an enlarged perspective of FIG. 4 with parts broken away;

FIG. 8 is a detailed view of the tube retaining means and leveling device;

FIG. 9 is a detailed view of the tube pivot means and leveling device;

DETAILED DESCRIPTION OF A PREFERRED EMBODIMENT

Figure 10:
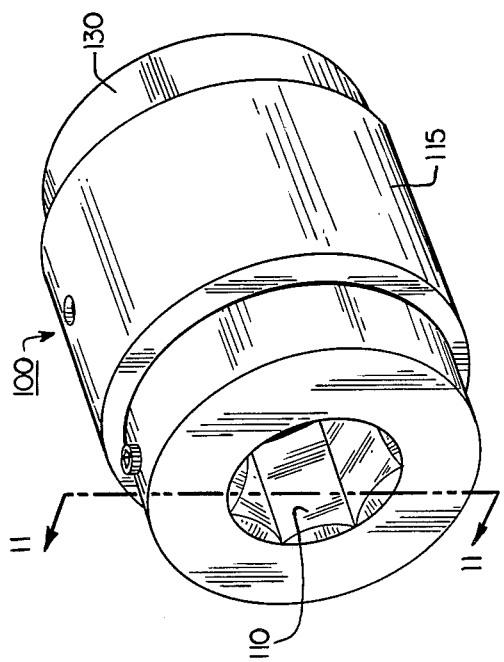
FIG. 10 is a perspective view of the needle bearing-mounted bushing used for irregularly shaped bar stock.

Looking first at FIG. 1, the bar stock feed support apparatus is shown generally at 10 in association with a CNC machine center MC. The machine center is not a part of the invention and is not discussed herein, beyond the area of its operative relationship to the invention. The machine center MC is representative of the type used by many contemporary shops, but it is to be understood that MC also can represent any type of lathe or machining center to which bar stock is fed for cutting, whether or not numerically controlled. Centers MC of the type described herein include a feeding orifice 15 (FIG. 2) having an inlet opening 17 through which bar stock BS is supplied. As the elongated lengths of stock BS are inserted into inlet 17, the stock is then fed automatically through the orifice and out of an outlet adjacent to the cutting head (not shown). As the stock BS travels through the orifice 15, the stock is also moving in a lengthwise rotation for the cutting operation. As described above, where the trailing or free end is not at least closely contained, the vibration effect significantly affects accuracy. Also as described above, when attempts have been made to contain the stock within very close tolerances, the drag created on rotation of the stock was so substantial as to reduce cutting speed and accuracy.

The apparatus 10 as shown generally includes two bar stock restraining sleeves 20 and 30 (FIGS. 3a and 3b). The first sleeve 20 is comprised of a master bushings 22 and a connected, elongated cylindrical tube 24. This first sleeve 20 is removably inserted in the feed orifice 15 of the machine center MC, positioned such that the master bushing 22 is adjacent the orifice outlet (not shown) to the cutting head. Thus positioned, the master bushings reduce the inner diameter of the feed orifice to that substantially equivalent to the outer diameter of the bar stock being fed; providing tolerance sufficient only to allow smooth and lubricated rotation of the stock during cutting.

The elongated cylindrical tube 24 provides a restraining channel for delivery of the bar stock but has an inner diameter somewhat greater than the bar stock, allowing for the uninhibited, drag-free rotation of the stock. The tube 24 also provides means for the insertion and removal of the connected bushing from the feed orifice.

FIG. 3b illustrates the second of the two sleeves, 30, supported exteriorly of the machine center. This second sleeve 30 is generally comprised of at least two, and preferably three or more bushings 32 connected in spaced relationship to each other by intermediate cylindrical tubes 34. A hollow support cylinder 40 is pivotally mounted on a supporting stanchion 44, and held in operative position (FIG. 1) by a releasable gripping mechanism 50 that is mounted on a second stanchion 46. A first or primary cylinder leveling device 70 is associated with stanchion 46, and a secondary cylinder leveling device 80 is associated with the pivot mechanism 90 of stanchion 44.

The stanchions 44 and 46 each further include a pair of horizontally mounted arms 48 thereon for containing a supply of bar stock thereon. The arms 48 include upwardly turned retainers 49 on each end thereof to prevent bar stock from rolling or falling off. A continuous shelf 48' supports the extra sleeves 30 so that the weight of the bushings is supported to avoid warping of the sleeve unit. In most environments, the stanchions include foot plates 43 welded to the bottoms thereof for use in attaching to the floor by conventional means such as bolts.

Looking next at FIGS. 3, 4, 5, 6 and 7, the relationship between the stock BS, the sleeves 20 and 30, and cylinder 40 is shown in detail. The hollow support cylinder 40 is preferably formed of a durable metallic such as aluminum; is of constant inner and outer diameters along the length thereof; and may be of any desired dimension. In a general purpose embodiment, the length might be in the range of six to eight feet, and the outer diameter three to four inches. Such dimension would be sufficient to efficiently handle bar stock, in lengths up to ten or twelve feet, with outer diameters up to one to two inches.

During operation the support cylinder 40 contains the selected second stock restraining sleeve 30, which sleeve is made in a length corresponding to that of cylinder 40. Although sleeve 30 can include any plurality of bushings 32, it has been found that three to four are sufficient to control vibration of the turning stock without significantly increasing drag. The illustration of three is not indicative of a limitation.

As previously explained, the sleeves 20 and 30 are made in a variety of sizes, the only variation generally being the inner diameter. The effective outer diameter of the sleeves, i.e., the outer diameter of the bushings 32, is controlled by the inner diameter of the cylinder 40 which generally does not vary. However, cylinder 40 may vary and the sleeve 30 should fit snugly, but removably within the cylinder with no rotational tolerance required. Locking pins or compression screws extending through the cylinder wall also may be used to engage sleeve 30 and prevent its rotation in the cylinder. The variable inner diameters of the sleeves, i.e., the inner diameter of the bushings 32, is determined by the outer diameter of the various bar stock BS being cut.

The inner diameter of the bushings 32 should be substantially that of the outer diameter of the bar stock allowing only a tolerance sufficient to permit rotation of the stock therein. To improve rotation and reduce drag on the stock, lubricating fluids are introduced by means of apertures 41 in the support cylinder 40, and apertures 36 in bushings 32. The apertures 41 and 36 should be correspondingly spaced in a lengthwise direction along the sleeve and cylinder, and when the sleeve is inserted in the cylinder, the aperture 36 should be upwardly oriented to effect an alignment with those of the cylinder. Therefore, when lubricating fluids are required they may be injected through the aligned apertures into the inner surfaces of the sleeve. Conventional oil pots 42 are associated with apertures 41 for containing a supply of lubricant.

The elongated tubes 34 which connect the bushings have inner diameters slightly greater than the inner diameter of the bushings, so that the tubes do not contact the bar stock. The tubes primarily function to connect the bushings and simplify insertion and removal of the bushings from the feed orifice 15 and the cylinder 40. The tubes 34 are inserted into a cut away portion 35 of the bushing (see FIG. 6). The connection may be secured by friction fit, adhesive, or other conventional fastening means so long as the fastener does not interfere with the rotation of the stock BS.

The dimensions of the sleeve 20 and master bushing 22 are determined in the manner described above, using the inner diameter of feed orifice 15 as the factor for the outer diameter of the master bushing, and the bar stock being cut as the factor for the inner diameter of the master bushing.

Turning now to the support mechanism, cylinder 40 is pivotally mounted on stanchion 44 and held in operative position by gripping mechanism 50 on stanchion 46. In use, cylinder 40, with the appropriately sized sleeve therein, is positioned so that the forward end 40a is aligned in abutting relationship with the inlet to feed orifice 15. Gripping mechanism 50 is then tightened to clamp the cylinder securely in place. Bar stock is then inserted through the rearward end of the cylinder and sleeve 40b in a conventional manner. When bar stock must, for any reason such as room space or arrangement, be inserted into the forward end 40a, the cylinder can be pivoted into the position of FIG. 2 for such insertion.

Cylinder gripping mechanism 50 is illustrated in detail in FIG. 8, operatively connected to the cylinder leveling means 70. The mechanism 50 is generally comprised of a flat plate 52 on which the cylinder 40 rests, an adjustable clamping arm 54 which pivotally supported by a pair of vertical legs 56, and a clamping arm adjustment means 58. The cylinder is pivoted into position resting on plate 52, immediately adjacent the edges of vertical legs 56. The clamping arm rests on top of cylinder 40, with the arcuate area 55 positioned along the arcuate surface of cylinder 40 (FIG. 1). Adjustment means 58, preferably comprised of a threaded screw mechanism 59, is adjusted upwardly or downwardly as necessary to tighten clamping arm 54 against the surface of the cylinder.

When it is required to adjust the vertical level of the cylinder relative to the feed orifice 15, leveling means 70 is utilized. The leveling device is comprised of a threaded vertical rod 72 which supports a horizontal base plate 74 thereon, with said plate 74 supporting a pair of leveling rods 76 thereon. The rods 76 extend through apertures in the top of stanchion 46 to a connection on the undersurface of plate 52. When necessary to adjust the vertical position of the cylinder, the vertical rod 72 is threaded upwardly or downwardly as appropriate, thereby displacing the leveling rods 76 and plate 52.

A second leveling device having only one leveling rod 76 is connected to pivot means 90. In this instance the single leveling rod 76 also acts as a pivot rod for displacing the cylinder to the position of FIG. 2. The cylinder 40 is secured to the pivot means by a retaining ring 91 and a conventional set screw 94.

Figure 11:
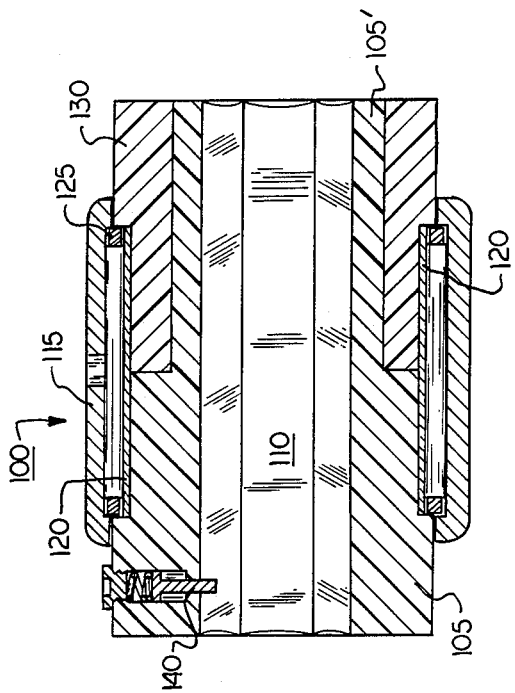
FIG. 11 is a cross-section taken along lines 11—11 of FIG. 10.

The apparatus shown in FIGS. 10 and 11 is a specialized bearing-mounted bushing 100 designed for controlling irregularly shaped bar stock. When the above-described bushings 22, 32 are utilized for cutting bar stock which has a hexagonal or square outer shape, the sharp edges of the bar stock cut into the inner wall of the bushing as the stock turns therein. Such an effect not only damages the wall of the bushing but also interferes with turning speed. Thus it was necessary to design a bushing having an inner wall which is shaped compatibly to the bar stock. The bushing 105 as shown has a hexagonal inner wall 110, although such wall could be square or any other shape. The bushing 105 is mounted on the inner surface of a needle bearing 115 of the type which includes a rotating inner wall 120. The bearing is a conventional needle-type bearing having elongated bearings 125 on which wall 120 turns. An end cap 130 is positioned over one end of bushing 105, seated in a notched away portion 105' of the bushing. The end cap 130 prevents entry of dirt, shavings and other types of grime into the bearings. An oil groove 135 is utilized for lubricating the bearings.

In some, but not all embodiments, it will be desirable to tap the outer wall of the bushing and insert a spring-loaded magnetic pin 140 through the top to contact bar stock being guided therethrough. Pin 140 is pushed upward against spring 145 when bar stock is inserted in the bushing. The magnetic attraction of the pin to metallic bar stock will cause the bushing to be pulled through the cylinder 40 as the bar stock moves therethrough. This arrangement works, effectively on short lengths of stock where perhaps only one apparatus 100 is needed. In longer bar stock, several bearing-mounted bushings 100 may be placed in cylinder 40 and do not move with the bar stock. In such arrangement, the magnetic pin 140 is unnecessary.

It is of course obvious that bearing-mounted bushings could be utilized rather than the bushings 22, 32.

Materials for constructing the sleeves 20 and 30 are not a limitation as it has been found that any durable, hard material such as stainless steel, other metals, or polymeric materials may be utilized for the bushing. Likewise, the connecting tubes 24 and 34 may be metallic or polymeric. It is also recognized that other and further modifications to materials, dimension, etc. may become apparent to those skilled in the art, while remaining within the scope of the claims below.

What is claimed is:

1. An apparatus for feeding bar stock to the automatic feed mechanism of a CNC machine center of the type which has a feed orifice through which bar stock is advanced to the cutting head and wherein said feed orifice has an inlet end through which the bar stock is inserted into the orifice, and an outlet end from which the bar stock leaves the feed orifice and enters the cutting head; said apparatus for feeding bar stock comprising:

(a) a first, internal stock retaining sleeve removably inserted within said feed orifice of the CNC machine center; said first retaining sleeve being comprised of:
  (i) at least one master bushing for controlling the bar stock at a point immediately preceding, and as the stock enters, the cutting head; said master bushing having a generally tubular configuration and being positioned in said feed orifice at or near the cutting head; said master bushing having an outer diameter substantially equivalent to the inner diameter of said feed orifice, and an inner diameter substantially equivalent to the outer diameter of the bar stock being cut;
  (ii) a prescribed length of rigid, tubular material mounted against and abutting one end of said master bushing such that said tubing extends from said master bushing to said inlet end of said feed orifice, and the opposite end of said bushing is adjacent said orifice outlet; said tubing having an inner diameter somewhat greater than the outer diameter of the bar stock to eliminate drag during the cutting operation;
(b) a second stock retaining sleeve supported exteriorly of the machine center for supplying bar stock to said feed orifice inlet; said second retaining sleeve being comprised of:

(i) at least two bushings having a tubular configuration and being connected in spaced relationship to each other by at least one cylindrical connecting tube;

(ii) each of said bushings having an inner diameter substantially equivalent to the outer diameter of the bar stock being cut, and said connecting tube shaving an inner diameter slightly greater than that of the bar stock so that the connecting tube abuts the ends of the bushings, to reduce drag during the turning and cutting operation;

(c) means for supporting said second retaining sleeve in abutting relationship to said feed orifice inlet, during use;

whereby the bar stock is fed through said second retaining sleeve into said feed orifice, exiting through said orifice outlet to the cutting head; and whereby the turning and cutting speed is increased substantially due to elimination of vibration and whipping effect on the bar stock by the close fit of the stock within said bushings.

2. An apparatus according to claim 1 wherein said means for supporting said second retaining sleeve in abutting relationship to said feed orifice inlet comprises:

(a) supporting stanchions positioned in spaced apart relationship to each other and to the machine center along a line extending axially and outwardly from said feed orifice;

(b) a hollow support cylinder for receiving and supporting said second retaining sleeve therein; said cylinder being secured to and supported by said stanchions such that said cylinder extends in axial alignment with said feed orifice;

(c) means for adjusting the alignment of said cylinder to said feed orifice.

3. An apparatus according to claim 2 wherein said support cylinder is pivotally attached to one of said stanchions, for pivotal movement in a horizontal plane to facilitate insertion of bar stock into said retaining sleeve.

4. An apparatus according to claim 2 wherein said means for adjusting the alignment of said cylinder includes:

(a) leveling means associated with each of said stanchions to adjust the vertical position of said cylinder; each of said leveling means comprising:

(i) at least one vertically adjustable rod movably mounted in an aperture extending through the upper surface of each said stanchion; said rods positioned such that said rod is underneath and supports one end of said cylinder; the inner surfaces of said apertures and the outer surfaces of said rods being threaded such that said rods can be adjusted upwardly or downwardly to level the appropriate end of said cylinder.

5. An apparatus according to claim 2 and further including a clamping means mounted on the upper surface of one of said stanchions and including a means for gripping around said stanchion to prevent pivoting thereof; said clamping means further including an adjustment means for adjusting the relative tightness of the gripping action on said cylinder.

6. An apparatus according to claim 1 wherein said second stock restraining sleeve is comprised of at least one bearing-mounted bushing adapted for cutting bar stock having an irregular cross-section; said bearing-mounted bushing being comprised of:

(a) a hollow, cylindrical bushing having an inner wall shaped according to the crosssectional shape of the prescribed bar stock;

(b) said bushing being mounted in the inner wall of a cylindrical needle bearing, such that said bushing rotates with the turning bar stock.

* * * * *